(12) United States Patent
Landers

(10) Patent No.: US 7,188,320 B1
(45) Date of Patent: Mar. 6, 2007

(54) GRAPHICAL USER INTERFACE FOR WIRELESS COMMUNICATIONS

(75) Inventor: R. Brian Landers, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 862 days.

(21) Appl. No.: 10/320,292

(22) Filed: Dec. 16, 2002

(51) Int. Cl.
*G06F 15/00* (2006.01)
*G06F 13/00* (2006.01)

(52) U.S. Cl. ........................... 715/850; 455/416
(58) Field of Classification Search ........... 715/840, 715/841, 843, 851, 850; 455/566, 416
See application file for complete search history.

(56) References Cited

U.S. PATENT DOCUMENTS 6,208,340 B1  3/2001  Amin et al.
6,282,435 B1  8/2001  Wagner et al.
6,889,039 B2 *  5/2005  Osman ............... 455/412.1
6,993,362 B1 *  1/2006  Aberg ..................... 455/566

* cited by examiner

*Primary Examiner*—Cao (Kevin) Nguyen

(57) ABSTRACT

A mobile station that includes a display, data storage, and a processor. A menu display routine stored in the data storage can be executed by the processor to display a set of menus ranging from a first menu to a last menu. Menus can include menu items ranging from first to last items. The mobile station may also include a "point of focus" routine and a navigation routine stored in the data storage, both routines executable by the processor. When the point of focus is on a particular menu (other than the last menu), user invocation of the navigation routine causes the processor to move the point of focus to a menu other than the particular menu. When the point of focus is on the last menu, user invocation of the navigation routine causes the processor to move the point of focus to a menu item within the last menu.

14 Claims, 5 Drawing Sheets

GRAPHICAL USER INTERFACE FOR WIRELESS COMMUNICATIONS

BACKGROUND

1. Field of the Invention

The present invention relates to wireless communications devices and, more particularly, to graphical user interfaces.

2. General Background

Presently, users of portable and wireless devices can navigate through a series of menu screens in order to access device functions. The menu screens are typically presented to users in sequence, one screen at a time, as users select individual graphical user interface (GUI) menus, or menu items, called "widgets". Because wireless device displays are relatively small (and also because the devices themselves are small and self-contained), widgets, menus, or objects are typically selected by a directional navigation key or similar device, rather than by a type of graphical input device that is more commonly used with larger systems, such as a stylus, mouse, or the like.

Additional functions may be carried out by statically or dynamically labeled "soft keys" whose functions can change according to the context of menus and items a user is accessing. For example, a user might scroll to a menu entitled "Buddy List", which would become the "point of focus", meaning that invoking a function (by, for example, pressing a soft key) would cause a program or routine invoked by a soft key to act on the Buddy List menu, rather than on other menus that are not "in focus." Typically, a particular menu or menu item that is in focus is differentiated from other menus by visual cues, such as outlining, or by otherwise changing visual attributes of the background and/or the text for the item that is in focus.

When using a navigation key to navigate a vertically oriented set of menus and menu items, for example, pressing the "down" arrow of a 4-way navigation key (i.e., a key with 4 directional arrows) may move the point of focus to a menu or item below the previously focused one (just as pressing the up arrow will highlight a menu above the previous menu), and pressing a "select" or "OK" soft key or dedicated key will select the highlighted menu and cause the device to perform an action in response to the selection. Such an action could include displaying a drop-down list of menu items associated with the selected menu.

Navigating through a series of menus and menu items associated with menus on a typical mobile station or other portable device can require numerous repetitions of scrolling to menus using a navigation key, selecting a menu using a soft key, scrolling to a menu item associated with the selected menu, and then selecting or activating the menu item using a soft key. Yet an additional repetition of such scrolling and selecting may be required if the selected menu item has subordinate items or actions associated with it. In such a system, a relatively large number of keystrokes may be required even if certain functions are performed far more frequently than others via the user interface.

In addition to necessitating a relatively high number of keystrokes, navigating typical interfaces one menu screen at a time requires users to remember where they are and where they would like to go in order to use the device. Thus, a user interface that presents more information in an intuitive manner, that provides a multi-element display, and that allows users to access and use a device's features with fewer keystrokes, is desired.

SUMMARY

In one aspect, a mobile station that includes a display, data storage, and a processor is disclosed. A menu display routine stored in the data storage can be executed by the processor to display a set of menus. The set of menus will range from a first menu to a last menu, and at least one menu of the set defines, in turn, a set of menu items. Each set of menu items can similarly range from a first menu item to a last menu item.

The mobile station may also include a "point of focus" routine stored in the data storage. The point of focus routine is executable by the processor to provide a single point of focus in or on one of the menus. The mobile station may also include a navigation routine stored in the data storage, which is executable by the processor. The processor executes the navigation routine in response to user invocation. When the point of focus is on a particular menu other than the last menu, user invocation of the navigation routine causes the processor to move the point of focus to a menu other than that particular menu. When the point of focus is on the last menu, user invocation of the navigation routine causes the processor to move the point of focus to a menu item in the last menu.

In another aspect, the mobile station may include a second navigation routine stored in the data storage and executable by the processor. The processor executes the second navigation routine in response to user invocation. When the point of focus is in the last menu, user invocation of the second navigation routine causes the processor to move the point of focus to the last menu in the set of menus. When the point of focus is on a particular menu other than the last menu, user invocation of the second navigation routine causes the processor to move the point of focus to a menu other than that particular menu.

DETAILED DESCRIPTION

Figure 1:
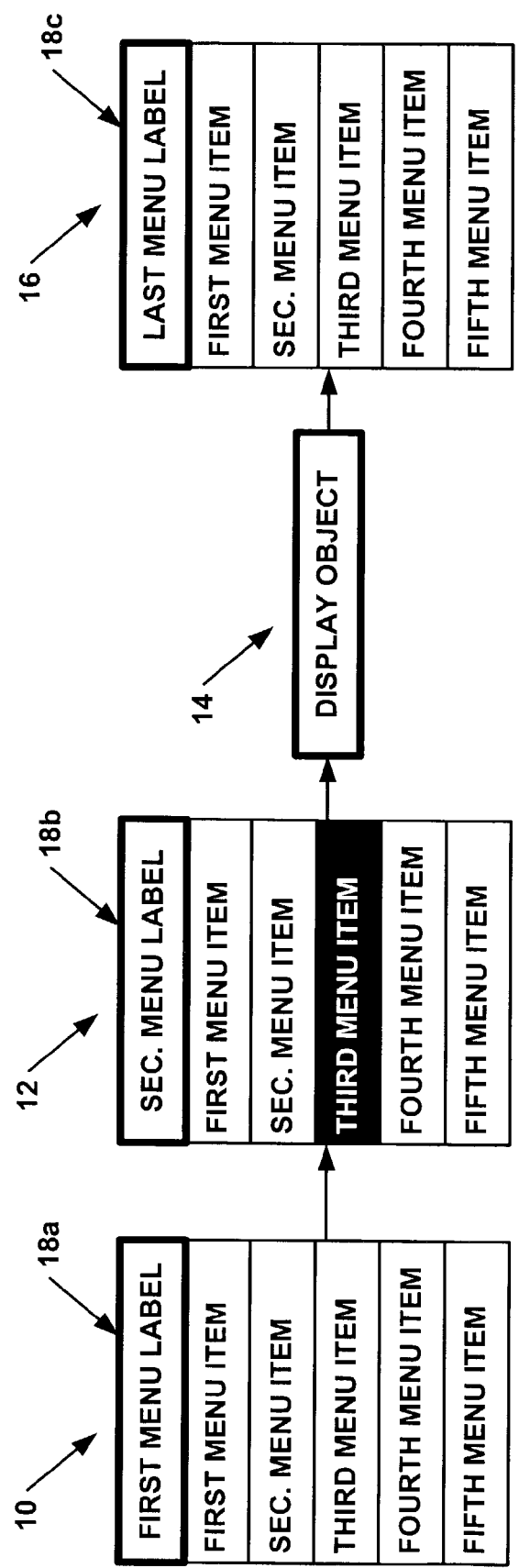
FIG. 1 illustrates a set of graphical objects that can be navigated by the present system.

In an exemplary embodiment of the invention, a graphical user interface is presented that can reduce the number of user operations required to perform various actions. The present system may be used in conjunction with mobile stations or virtually any devices that have graphical user interfaces. A navigation key may be used to allow a user to cycle through different objects, menus, or both, that are displayed on the device. When a GUI object or menu is in focus, the GUI's soft key labels can change accordingly. Pressing a key associated with the contextual soft key label will execute the indicated action on the object that is in focus.

The number of keystrokes required to perform a function when using a GUI can be reduced by changing the functionality of the navigation key depending on where the point of focus is. A navigation routine stored in memory can be invoked to change the functionality. For example, pressing a down arrow (or another arrow) when the point of focus is on the last menu in a set of menus can move the point of focus to an item in that last menu. In contrast, pressing the same key or arrow when the point of focus is on a menu other than the last menu will simply move the point of focus to another menu (i.e., to another menu at the same hierarchical level). This can eliminate the need to explicitly select a menu, such as a "Buddy List" menu, before individual "buddies" (i.e., menu items) associated with the Buddy List menu can be displayed. (Explicitly selecting a menu without a navigation routine as described is typically done by pressing a soft key with an appropriate label. For example, a user could scroll to a widget labeled "Buddy List" and then press a soft key labeled "ok"). In contrast to existing user interfaces, the exemplary system allows users to simply continue to scroll down once the Buddy List menu (if it is the last menu) is reached to move the point of focus to successive "buddies" in the Buddy List menu.

For purposes of the present description, there is a distinction between the point of focus being "on" a menu and being "in" a menu, as follows: The point of focus is "on" a menu when a user first navigates to the menu but has not yet navigated to a particular item in the menu (e.g., drop-down list). When the point of focus is on a menu, the menu label or title, rather than any items in the menu, will be highlighted. The point of focus is "in" a menu, on the other hand, when the user navigates to an individual widget or item in the menu.

The number of keystrokes required to navigate to a particular item can also be reduced by changing the functionality of the navigation key with a second navigation routine, in addition to the method described above. In this second navigation routine, when the point of focus is "in" a menu, the single press of an arrow on the navigation key can be used to move the point of focus immediately to another menu, which ordinarily might require an explicit "exit" function to be invoked, or which might otherwise require scrolling sequentially through more menu items and finally out of the menu.

Keystrokes can be reduced further by associating or assigning a frequently used function or action with a menu item rather than requiring a user to first select a menu item and then select a function or action to be performed that is associated with the menu item. To continue with the Buddy List example, a default function (which could be displayed in conjunction with the menu to remind users what the default is) can be designed into the interface. In the instant messaging context, composing a new message to a buddy would probably be the most frequently used function. Scrolling to a buddy in the list could thus cause a soft key label "compose" to be displayed, eliminating the need for a user to navigate to the "compose" function after a particular buddy is selected. This is in contrast to existing interfaces, in which, after a buddy is selected, the user must select a soft key label called "menu" associated with that buddy, and then must scroll to a "compose" widget in a new list which completely replaces the buddy list menu. Of course, other less frequently used functions associated with menu items (e.g., buddies) could also be accessed.

Referring now to the drawings, FIG. 1 illustrates a set of menus 10, 12, and 16, a display object 14, and drop-down lists associated with the menus. The current system can be used to navigate to items 10–16, and to any item in menus 10, 12, and 16. Menu 10 is referred to as the first menu in FIG. 1. Menu 10 is, for the purposes of this system, only the "first" menu when a user is navigating toward menu 16, which is then, relative to menu 10, the "last" menu. Thus, if a user were to navigate from menu 16 toward menu 10, menu 16 could be referred to as the first menu, and menu 10 could be referred to as the last menu. As shown, menus 10, 12, and 16 have menu labels 18a, 18b, and 18c, respectively, that describe the menus.

As described above, the point of focus would be "on" menu 10, for example, if label 18a ("First Menu Label") were highlighted. Menus 10, 12, and 16, and object 14 are on the same hierarchical level, while the menu items in the drop-down lists are one hierarchical level below menus 10, 12, and 16. As shown in FIG. 1, the point of focus is in menu 12, on item 3.

The First Navigation Routine

The first navigation routine can reduce keystrokes and provide an easier to use, more intuitive user interface by dynamically controlling the point of focus in the interface in response to repetitive actuation of the same navigation key or the same part of a navigation key. Thus, the first routine gives a different function to the same navigation key based on where the point of focus is.

Figure 2:
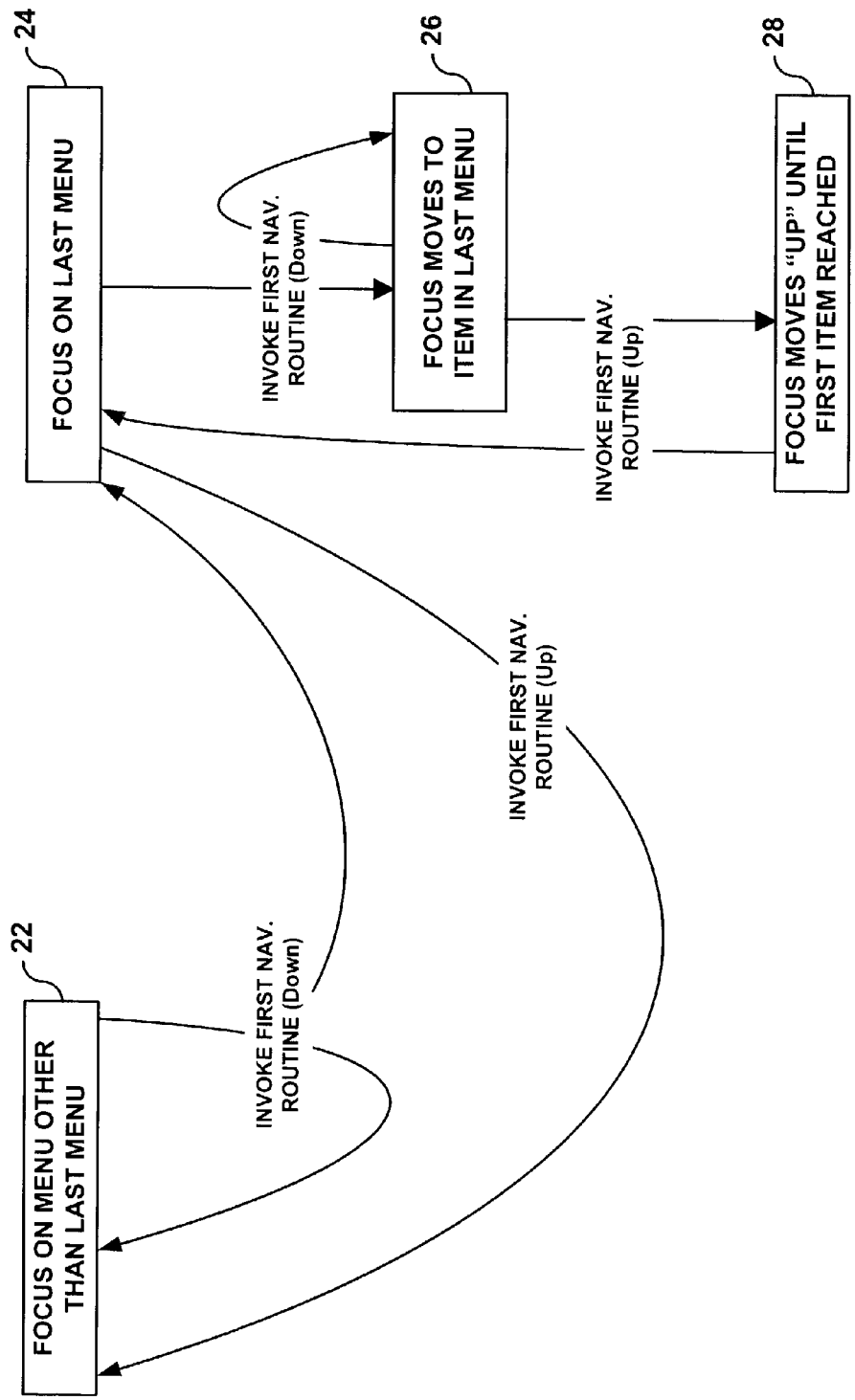
FIG. 2 is a state diagram illustrating the operation of a first navigation routine of the present system.

FIG. 2 is a state diagram that illustrates the operation of the first navigation routine. The first navigation routine can be invoked in two or more directions, allowing a user to navigate up, down, or sideways through a set of menus or objects. As a convention, the present system with regard to FIGS. 1 and 2 will be described in the "up" and "down" directions, although the function of the first navigation routine could also be implemented as described in a left or right direction. For purposes of illustration, menus 10, 12, and 16, as well as object 14 in FIG. 1, are shown side-by-side, but on a display, menu 10 could be graphically displayed above menu 12, which could in turn be above object 14, which could be above menu 16.

Invocation of the first navigation routine in the down direction when the point of focus is not on or in the last menu, indicated at state 22, causes the processor to move the point of focus to another menu in the set of menus. The point of focus will then either be on another menu that is not the last menu, back to state 22, or to the last menu, indicated by state 24. The point of focus would move to the last menu when the first navigation routine is invoked in the down direction when the point of focus begins on the next to the last menu. As an example, and referring back to FIG. 1, if the point of focus is on first menu 10, pressing the "down" arrow of a navigation key once (invoking the first navigation routine in the down direction) will move the point of focus to menu 12; thus, in this example, the system would return to state 22.

Pressing the down arrow again would move the point of focus to display object 14, which is an intermediate object at the same hierarchical level as menu 14; display object 14 has no associated menu items. Since object 14 is not the last menu, the system will still be in state 22. Pressing the down arrow again would move the point of focus to the last menu, menu 16. The navigation routine can now recognize that the point of focus is on the last menu, so the system will be in state 24. It is at this point that the navigation routine changes the operation of the navigation key. Invoking the first navigation routine again in the down direction by pressing the down arrow will move the point of focus to the first menu item of menu 16, at which point the system will be in state 26. In state 26, each successive pressing of the down arrow will move the point of focus to another item in the menu, from first to last, and invoking the routine from the last menu item can move the point of focus back to the first menu item in menu 16. Other alternative modes of operation are possible for state 26. For example, when the last item in menu 16 is reached, pressing the down arrow could move the point of focus back to menu 10. As another alternative, pressing the down arrow could move the point of focus back to main menu 14.

The first navigation routine may also be invoked in the up direction by pressing the "up" arrow of the navigation key. For example, if the point of focus is in menu 16, such as on the fifth menu item of menu 16 in FIG. 1, pressing the up arrow can move the point of focus to the fourth menu item, and the routine will be in state 28. In state 28, repeatedly pressing the up arrow will move the point of focus through menu items from the last (e.g., the fifth) toward the first until the first item is reached. At that point, pressing the up arrow will move the point of focus to menu 16 (i.e., menu label 18c), and the system will be in state 24. Pressing the up arrow again will move the point of focus to another menu or object (in this example, display object 14), and the system will again be in state 22.

The Second Navigation Routine

The second navigation routine can also reduce keystrokes and make the interface easier to use and more intuitive by dynamically controlling the point of focus in response to repetitive actuation of the same navigation key or arrow of a navigation key, although a different arrow of the navigation key could also invoke one or more navigation routines. The second navigation routine allows a user to exit a menu directly and, using the same navigation key used to exit, scroll to different higher-level menus in a set of menus.

Figure 3:
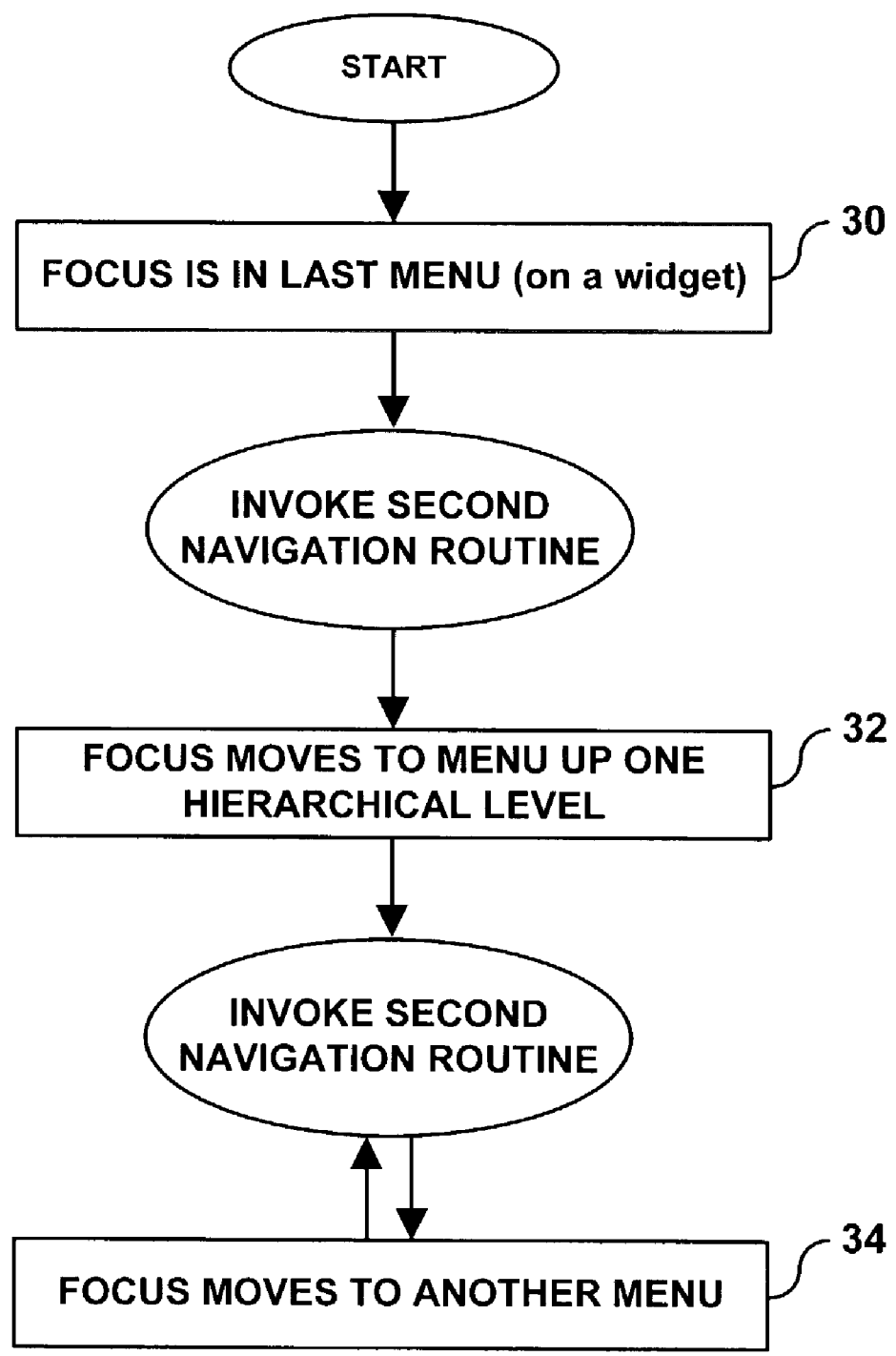
FIG. 3 is a flow chart illustrating the operation of a second navigation routine of the present system.

The second navigation routine may also be executed by the processor in response to user invocation. In the second routine, when the point of focus is on an item in the last menu, as indicated at block 30 of FIG. 3, pressing an arrow key that invokes the second navigation routine causes the processor to move the point of focus up one hierarchical level to the menu that includes the menu item. Referring to FIG. 1, for example, if the point of focus is on the fourth menu item of menu 16, pressing the "left" arrow of the navigation key would move the point of focus directly to menu 16, indicated by highlighting menu label 18c. This step is shown at block 32 of FIG. 3.

On the other hand, when the point of focus is on a particular menu, user invocation of the second navigation routine simply causes the processor to move the point of focus to another menu. Thus, pressing the left navigation key again would move the point of focus to another object or menu at the same hierarchical level, as shown at block 34. Referring back to FIG. 1, the point of focus would move from 18c to display object 14. Pressing the left key again would move the point of focus to menu 12, and again would move it to menu 10. Accordingly, the second navigation routine, like the first, gives a different function to the same navigation key depending on where the point of focus is.

Figure 4:
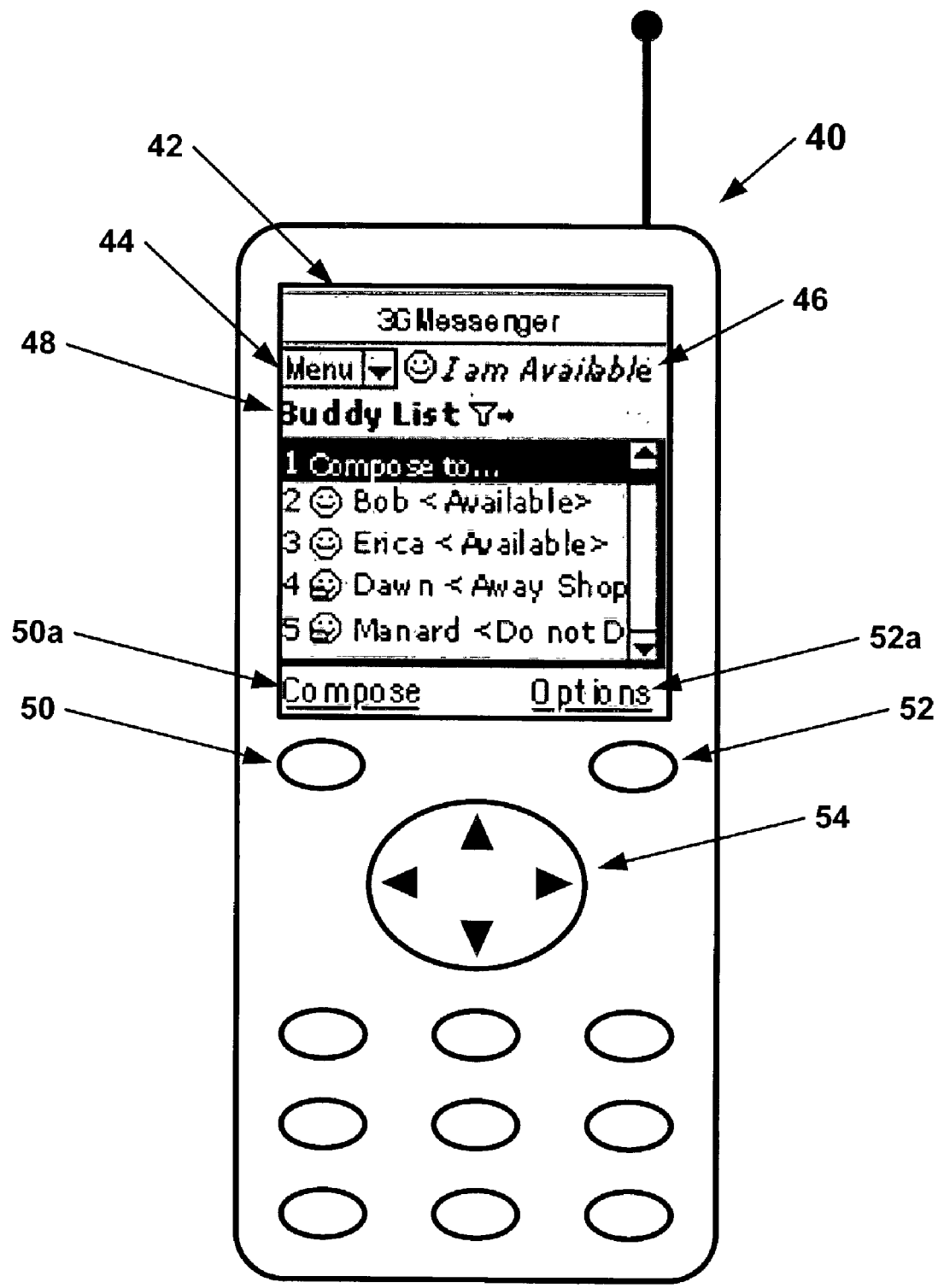
FIG. 4 illustrates a mobile station that includes a graphical user interface in accordance with the present system.

FIG. 4 illustrates a mobile station 40 that may be used in accordance with these navigation principles. As shown, display 42 of mobile station 40 may include a main menu 44, a status indicator 46, and a buddy list menu 48. Other menus and objects are possible as well. The mobile station 40 may also include soft keys 50 and 52, together with associated soft key label areas 50a and 52a on display 42 directly above the soft keys. Pressing a soft key executes a function indicated by the currently displayed soft key label. The mobile station 40 may also include a four-way navigation key 54. The display of mobile station 40 of FIG. 4 depicts the graphical user interface of a digital messaging application program that can be used in accordance with the present system. FIG. 4 is exemplary only, however, and variations are possible.

If the "Compose to . . . " item in the Buddy List menu 48 is initially in focus as shown, the text of the item will appear light on a dark background to indicate the point of focus, whereas all other selectable text of the display 42 may be dark on a light or intermediate background. Generally, when a drop-down list of menu items is active (that is, when the user has navigated to the top-level menu associated with the list), the background of the drop-down list may appear light to distinguish over the rest of the display background which may be at an intermediate contrast, as shown. The functions of the navigation routines described above apply to mobile station 40 where the Buddy List menu 48 is the last menu, status indicator 46 is an intermediate object at the same hierachical level as menu 48, and main menu 44 is the first menu. Main menu 44 has an associated list of items that are not shown in the figure, but that can be shown when the menu is selected by executing a navigation routine or pressing a soft key when the point of focus is on the main menu.

Figure 5:
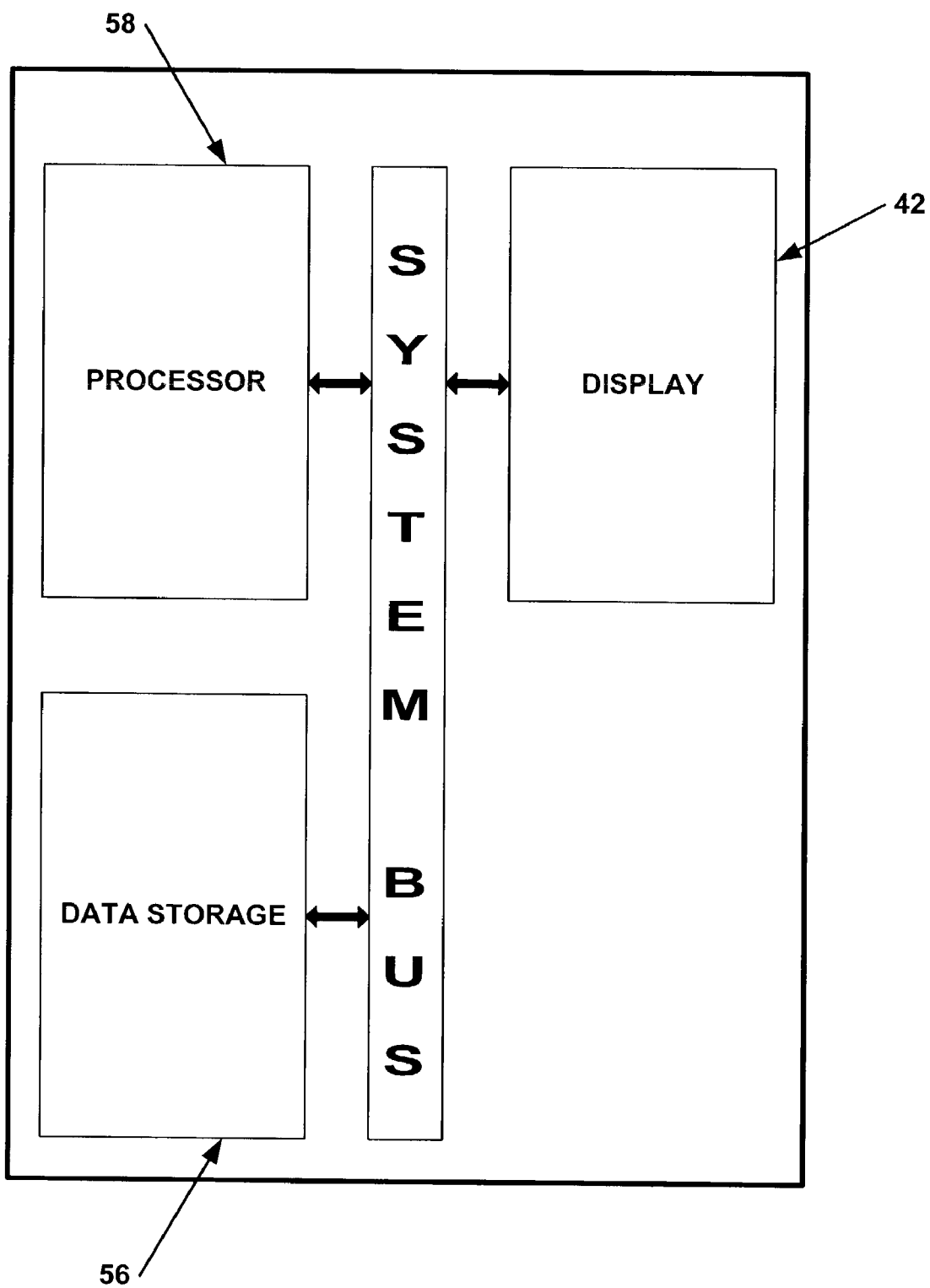
FIG. 5 is a block diagram of a mobile station in which an exemplary embodiment of the present system can be implemented.

As shown in FIG. 5, a mobile station or other device in accordance with the present system may include display 42, data storage 56, and a processor 58, all of which may be interconnected by a system bus or other suitable interconnection. Alternatively or additionally, a device could include hardware, firmware, or both for carrying out various functions described. The data storage may include a menu display routine that is executable by the processor to display a set of menus, which could in turn range from a first menu to a last menu. One or more menus of the set can define an associated set of menu items or "widgets", and each set of menu items can include at least a first menu item and a last menu item.

The data storage may also include one or more navigation routines. The navigation routines are executable by the processor to provide a single point of focus in or on one or more of the menus, and the processor can execute the routines in response to user invocation. The routines can control the point of focus in a way that saves keystrokes and that allows a single key to be used in place of multiple keys to navigate a graphical user interface.

Exemplary embodiments of the present system have been described above. Those skilled in the art will understand, however, that changes and modifications may be made to these embodiments without departing from the true scope and spirit of the invention, which is defined by the claims.

I claim:

1. A mobile station comprising:
   a display;
   data storage;
   a processor;
   a menu display routine stored in the data storage and executable by the processor to display a set of menus, the set of menus ranging from a first menu to a last menu, at least one menu of the set of menus defining a respective set of menu items, each set of menu items comprising at least a first menu item and a last menu item;
   a point of focus routine stored in the data storage and executable by the processor to provide a single point of focus in or on one of the menus; and
   a first navigation routine stored in the data storage and executable by the processor, wherein the processor executes the first navigation routine in response to user invocation;

wherein, when the point of focus is on a menu other than the last menu, user invocation of the first navigation routine causes the processor to move the point of focus to a menu; and wherein, when the point of focus is on the last menu, user invocation of the first navigation routine causes the processor to move the point of focus to a menu item in the last menu.

2. The mobile station of claim 1, further comprising a navigation key operable by a user to invoke the first navigation routine.

3. The mobile station of claim 2, wherein pressing a down arrow on the navigation key causes the point of focus to move through menus sequentially from the first menu toward the last menu.

4. The mobile station of claim 3, wherein pressing the down arrow when the point of focus is on the last menu item in the last menu causes the point of focus to move to the first menu item in the last menu.

5. The mobile station of claim 1, further comprising:
a second navigation routine stored in the data storage and executable by the processor, wherein the processor executes the second navigation routine in response to user invocation;
wherein, when the point of focus is on an item in the last menu, user invocation of the second navigation routine causes the processor to move the point of focus to the last menu in the set of menus; and
wherein, when the point of focus is on a particular menu, user invocation of the second navigation routine causes the processor to move the point of focus to a menu other than the particular menu.

6. The mobile station of claim 5, further comprising a navigation key operable by a user to invoke the second navigation routine.

7. The mobile station of claim 6, wherein actuation of a first single navigation key invokes the first navigation routine, and wherein actuation of a second single navigation key invokes the second navigation routine.

8. A mobile station comprising:
a display;
data storage;
a processor;
a menu display routine stored in the data storage and executable by the processor to display a set of menus, the set of menus ranging from a first menu to a last menu, the last menu defining at least one set of menu items, the at least one set of menu items comprising at least a first menu item and a last menu item;
a point of focus routine stored in the data storage and executable by the processor to provide a single point of focus in or on one of the menus; and
a first navigation routine stored in the data storage and executable by the processor, wherein the processor executes the first navigation routine in response to user invocation;
wherein, when the point of focus is on a menu other than the last menu, user invocation of the first navigation routine causes the processor to move the point of focus to a menu;
wherein, when the point of focus is on the last menu, user invocation of the first navigation routine causes the processor to move the point of focus to a menu item in the last menu; and a second navigation routine stored in the data storage and executable by the processor, wherein the processor executes the second navigation routine in response to user invocation;
wherein, when the point of focus is on an item in the last menu, user invocation of the second navigation routine causes the processor to move the point of focus to the last menu in the set of menus; and
wherein, when the point of focus is on a particular menu, user invocation of the second navigation routine causes the processor to move the point of focus to a menu other than the particular menu.

9. The mobile station of claim 8, further comprising a navigation key operable by a user to invoke the first navigation routine and the second navigation routine.

10. A mobile station comprising:
a display;
data storage;
a processor;
a menu display routine stored in the data storage and executable by the processor to display a set of menus, the set of menus ranging from a first menu to a last menu, at least one menu of the set of menus defining a respective set of menu items, each set of menu items comprising at least a first menu item and a last menu item;
a point of focus routine stored in the data storage and executable by the processor to provide a single point of focus in or on one of the menus; and
a first navigation routine stored in the data storage and executable by the processor, wherein the processor executes the first navigation routine in response to user invocation;
wherein, when the point of focus is on a menu item other than the first menu item in the last menu, user invocation of the first navigation routine causes the processor to move the point of focus to another menu item in the last menu;
wherein, when the point of focus is on the first menu item in the last menu, user invocation of the first navigation routine causes the processor to move the point of focus to the last menu; and
wherein, when the point of focus is on the last menu, user invocation of the first navigation routine causes the processor to move the point of focus to a menu other than the last menu.

11. A mobile station comprising:
a display;
data storage;
a processor;
a menu display routine stored in the data storage and executable by the processor to display a set of menus, the set of menus ranging from a first menu to a last menu, at least one menu of the set of menus defining a respective set of menu items, each set of menu items comprising at least a first menu item and a last menu item;
a point of focus routine stored in the data storage and executable by the processor to provide a single point of focus in or on one of the menus; and
a first navigation routine stored in the data storage and executable by the processor, wherein the processor executes the first navigation routine in response to actuation of a first single key, execution of the first navigation routine:
moves the point of focus to a menu when the point of focus is on a menu other than the last menu; and moves the point of focus to a menu item in the last menu when the point of focus is on the last menu.

12. The mobile station of claim 11, wherein actuating the first single key when the point of focus is on the last menu item in the last menu causes the point of focus to move to the first menu item in the last menu.

13. The mobile station of claim 11, further comprising:
a second navigation routine stored in the data storage and executable by the processor, wherein the processor executes the second navigation routine in response to actuation of a second single key, execution of the second navigation routine:
moves the point of focus to the last menu in the set of menus when the point of focus is on an item in the last menu; and
moves the point of focus to a menu other than the last menu when the point of focus is on the last menu.

14. A mobile station comprising:
a display;
data storage;
a processor;
a menu display routine stored in the data storage and executable by the processor to display a set of menus, the set of menus ranging from a first menu to a last menu, at least one menu of the set of menus defining a respective set of menu items, each set of menu items comprising at least a first menu item and a last menu item;
a point of focus routine stored in the data storage and executable by the processor to provide a single point of focus in or on one of the menus; and
a navigation routine stored in the data storage and executable by the processor, wherein the processor executes the navigation routine in response to actuation of a single key, execution of the navigation routine:
moves the point of focus to the last menu in the set of menus when the point of focus is initially on an item in the last menu; and
moves the point of focus to a menu other than the last menu when the point of focus is initially on the last menu.

* * * * *